United States Patent Office 3,577,397
Patented May 4, 1971

3,577,397
PROCESS AND PRODUCT FROM TREATING LIVE ELASTOMERS WITH PHOSPHAZENES
Adel F. Halasa, Bath, Ohio, and Russell W. Koch, Blacksburg, Va., assignors to The Firestone Tire & Rubber Company, Akron, Ohio
No Drawing. Continuation of application Ser. No. 711,927, Mar. 11, 1968. This application Nov. 24, 1969, Ser. No. 879,596
Int. Cl. C08d 5/04; C08f 27/08
U.S. Cl. 260—85.1           13 Claims

ABSTRACT OF THE DISCLOSURE

The process described herein involves a method of converting relatively low molecular weight elastomers prepared by alkali metal-catalyzed polymerizations, such as alkyllithium catalyst polymerizations, and still containing active lithium or other alkali metal therein, by postreaction with phosphazenes, which can be represented as $(PNCl_2)_x$ wherein $x$ is 3 or 4. The postreacted products are highly branched elastomers having a broad molecular weight distribution and possessing less cold flow than the polymers from which they are produced. Surprisingly, even though the molecular weight of the polymer is increased many times, the reaction product displays little or no cold flow even after extension with oil.

This application is a continuation of copending application Ser. No. 711,927, filed Mar. 11, 1968.

BACKGROUND OF THE INVENTION

Field of the invention

This invention relates to a method for postreacting alkali metal-elastomers, particularly diene-alkenyl aryl copolymers such as butadiene-styrene copolymers, with a phosphazene to convert the relatively low molecular weight starting elastomer to highly branched high molecular weight elastomers having improved resistance to cold flow.

Related prior art

It is known in the prior art to postreact lithium-active polymers with silicon tetrachloride (see U.S. Pat. 3,244,664), and to postreact polymers containing terminally positioned alkali metal with active halogen-containing compounds such as bis(chloromethyl)ether, 1,4-bis(chloromethyl)-benzene, etc. (See U.S. Pat. 3,078,254.) In such cases, however, the desired increase in molecular weight and the desired processability and green strength are not obtained in the products.

Moreover, the phosphazene having the formula $(PNCl_2)_3$, sometimes referred to as the cyclic trimer of phosphonitrilic chloride, has been reacted with polystyrene resin having active lithium attached thereto.

In the prior art when elastomers of high molecular weight are prepared, the elastomers are very difficult to process. Because of this difficult processability of elastomers having high molecular weights and because of the hard properties imparted to polystyrene resin when reacted with phosphonitrilic chloride, it would be expected that the phosphazene reaction products of alkali metal-active elastomers would likewise be difficult to process when taken to a high Mooney viscosity. Furthermore, because of the high degree of unsaturation in diene elastomers, it would also be considered that the various other reactions that might occur simultaneously with the reaction of the active metal sites with the phosphonitrilic acid chloride would cause considerable crosslinking and other reactions to give hard, difficultly processable, non-elastomeric products.

SUMMARY OF THE INVENTION

Most surprisingly, however, it is found in accordance with the present invention that alkali metal-active diene elastomers can be postreacted with phosphazenes having the formula $(PNCl_2)_x$ wherein $x$ is 3 or 4, to give products having very much increased molecular weights without loss or impairment of their elastomeric properties. Also, it is found that the molecular weight can be taken to a high value, allowing the product to be extended with oil to increase the plasticity of the polymer to the appropriate range.

Moreover, it is found that desirable properties are imparted to the resultant elastomer by the presence of phosphorus retained in the elastomer molecules. The improved properties include improved processability in fabrication, improved vulcanization rate, and higher tensile strength and higher modulus in the vulcanizate.

The processability and green strength of the postreacted polymer are much better than for a linear polymer of corresponding plasticity. Consequently, the ultimate elastomer composition has improved cold flow resistance, improved processability and green strength. "Green strength" is known in the rubber art as the cohesive strength of an unvulcanized rubber or rubber composition and the resistance it shows to being pulled apart.

Also, an advantage of the postreaction process of this invention is that a relatively low melocular weight elastomer, such as a butadiene-styrene copolymer having a high plasticity, can be reacted to give a product having a plasticity considerably lower than is required for ultimate use. The improved properties of the postreacted product permit oil extension to increase the plasticity to the desired range.

The postreaction of this invention is advantageously performed at a temperature in the range of $-50$ to $150°$ C., preferably 20 to $120°$ C. using a polymer containing 0.1–10 gram millimoles of alkali metal, such as lithium in the form of C-Li, preferably 0.4–0.8 gram millimole per 100 grams of polymer. The phosphazene is used in a proportion of 0.01–100 gram millimoles, preferably 0.025–0.25 gram millimole per 100 grams of polymer.

The postreaction product of this invention has a desirable molecular weight distribution, as indicated by gel permeation chromatography (GPC) determined according to standard tests as described in the literature.

While it is not intended to restrict the invention to any theory or the product to any particular structure, it is believed that the reaction of the alkali metal-active polymer, in this case, a lithium-active polymer represented by RLi wherein R is a linear polymer chain and $x$ has a value of 3 or 4, can be represented as follows:

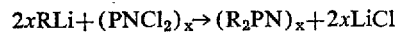

For example, where $x$ is 3, the reaction can be represented as:

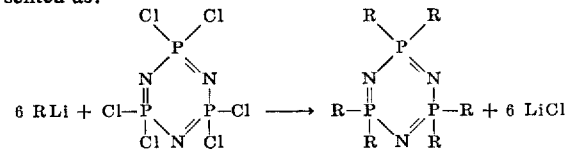

Where $x$ is 4, the reaction can be represented as:

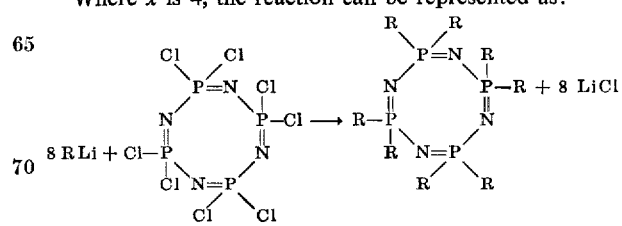

Conjugated dienes suitable for preparing lithium-active elastomers for use in the practice of this invention can be represented by the formula

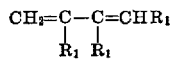

wherein $R_1$ represents hydrogen and alkyl or an aryl radical, preferably one having no more than seven carbon atoms.

In addition to butadiene-1,3, the various other conjugated dienes that can be used include isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene and the like.

Various monomers that can be used in preparing alkali metal-active elastomers or copolymers of conjugated dienes for use in this invention include any copolymerizable monomers that is free of groups containing active hydrogen that will react with the alkali metal catalyst such as in hydroxy and acid groups. Suitable monomers include vinyl aryls, as listed below, and also: the acrylate esters, such as, for example, methyl acrylate, ethyl methacrylate, benzyl acrylate, butyl acrylate, methyl methacrylate, etc.; vinyl esters, such as vinyl acetate, vinyl benzoate, vinyl propionate, vinyl butyrate, etc.; allyl esters, such as allyl acetate, allyl propionate, allyl butyrate, methallyl acetate, methallyl propionate, methallyl benzoate, and the like; isopropenyl esters, such as isopropenyl acetate, isopropenyl benzoate, isopropenyl propionate, isopropentyl butyrate, etc.; various mixed esters of polybasic acids, such as, for example, allyl methyl phthalate, allyl methyl succinate, vinyl methyl succinate, vinyl ethyl phthalate, isopropenyl butyl succinate, allyl methyl oxalate, etc.; various esters of dibasic unsaturated acids, such as dimethyl maleate, diethyl maleate, dibutyl maleate, dimethyl fumarate, diethyl fumarate, dimethyl itaconate, diethyl itaconate, dibutyl itaconate, etc.; various unsaturated ethers, such as vinyl methyl ether, vinyl ethyl ether, vinyl butyl ether, allyl methyl ether, allyl ethyl ether, allyl amyl ether, isopropenyl methyl ether, isopropenyl ethyl ether, isopropenyl butyl ether, methallyl ethyl ether, methallyl butyl ether, vinyl phenyl ether, isopropenyl phenyl ether, etc.; acrylonitrile, methacrylonitrile, dimethylacrylamide, vinyl chloride, vinylidene chloride, and the like.

The non-aromatic alpha olefins such as ethylene, propylene, butene-1, hexene-1 and the like can also be used provided an appropriate catalyst system is used such as a combination of an alkyl lithium, e.g. n-butyllithium, and a chelating diamine, such as symmetrical dimethyl ethylenediamine. However, if such an appropriate catalyst system is not used these alpha olefins will not polymerize. In fact, with n-butyllithium by itself, the non-aromatic alpha olefins are so immune to polymerization that they can be used as solvents for polymerization of other monomers such as butadiene and other conjugated dienes.

While copolymers of all proportions of diene and monoalkenyl compounds are broadly embraced by the invention, it is preferred that the diene copolymers contain from about 5 to about 50 percent monoalkenyl compound, preferably vinyl or alphamethylvinyl, and correspondingly from about 95 to about 50 percent butadiene-1,3 or other other conjugated diene.

Suitable alkenyl aryl compounds for this purpose in preparing lithium-active diene elastomers are represented by the formula

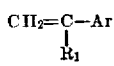

wherein R represents hydrogen or methyl so that the alkenyl group includes vinyl and α-methylvinyl or isopropenyl, and Ar represents phenyl, naphthyl and the alkyl, cycloalkyl, aryl, alkaryl, aralkyl, alkoxy, aryloxy and dialkylamino derivaties of phenyl and naphthyl, with the total number of carbon atoms in the derivative groups not exceeding twelve.

Various alkenyl aryl compound that can be used include: styrene, α-methylstyrene, 1-vinylnaphthalene, 2-vinylnaphthalene, α-methylvinylnaphthalene and alkyl, cycloalkyl, aryl, alkaryl, aralkyl, alkoxy, aryloxy and dialkylamino derivatives thereof in which the total number of carbon atoms in the combined substituents is generally not greater than twelve. Examples of these aromatic monomers include:

4-isopropenyltoluene
3-methylstyrene(3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert-butylstyrene
2,3,4,5-tetramethylstyrene
4-(4-phenyl-n-butyl)styrene
3-(4-n-hexylphenyl)styrene
4-methoxystyrene
3,5-diphenoxystyrene
3-decylstyrene
2,6-dimethyl-4-hexoxystyrene
4-dimethylaminostyrene
3,5-diethylaminostyrene
4-methoxy-6-di-n-propylaminostyrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylynaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-1-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene
4-methyl-1-vinylnaphthalene
6-phenyl-1-vinylnaphthalene
3,6-dimethylamino-1-vinylnaphthalene
7-dihexyl-2-vinylnaphthalene
4-methyl-α-methylstyrene
2-ethyl-5-isopropenylstyrene Preferred catalysts for preparing the alkali metal-active polymers, e.g. lithium-active polymers suitable for use in this invention are alkyl lithium or other alkylalkali metal compounds, but the hydrocarbon alkali metal compounds in general are operable in producing the alkali metal-active polymers of this invention. Preferably the hydrocarbon groups have, for example, from 1 to 4 carbon atoms on which lithium or other alkali metal has replaced hydrogen. Suitable lithium hydrocarbon compounds include, for example, alkyl lithium compounds such as methyl lithium, ethyl lithium, butyl lithium, amyl lithium, hexyl lithium, 2-ethylhexyl lithium, n-dodecyl lithium and n-hexadecyl lithium. Unsaturated lithium hydrocarbons are also operable, such as allyl lithium, methallyl lithium and the like. Also operable are the aryl, alkaryl and aralkyl compounds, such as phenyl lithium, the several tolyl and xylyl lithiums, alpha- and beta-naphthyl lithium and the like. While lithium catalysts are preferred for this purpose the other alkali metals can be used, i.e. sodium, potassium, cesium and rubidium and compounds of these corresponding to the lithium compounds listed herein are likewise suitable.

Mixtures of such hydrocarbon metal compounds may also be employed. For example, desirable catalysts may be prepared by reacting an initial hydrocarbon lithium compound successively with an alcohol and then with an olefin such as isopropylene (a technique analogous to the "Alfin" technique), whereby a greater or lesser proportion of the lithium from the initial hydrocarbon goes to form lithium alkoxide and to form a new organolithium compound with the olefin.

Surprisingly, the catalytic action of the hydrocarbon lithium catalysts employed to produce the polymers of the invention does not appear to be affected by the presence of salts of other alkali metals as impurities. For instance, in the synthesis of hydrocarbon alkali metal compounds, alkali metal halides are produced as by-products, while in catalysts produced by the "Alfin" technique, alkali metal alkoxides are formed. Where in these polymerization reactions alkali metals other than lithium are employed, either in the form of the metal alone or in alkali metal hydrocarbons, these extraneous compounds exert a different effect upon the structure produced.

Also suitable for this purpose are the other anionic polymerization catalysts listed in U.S. Pat. No. 3,317,918, such as the polylithium hydrocarbons, lithium dihydrocarbon amides, metallic lithium, salt mixtures with colloidally dispersed lithium metal, composites of a fluorine-containing salt and lithium metal or lithium hydrocarbon.

It is essential that air be excluded during the preparation of all of the catalyst materials described. Thus, whether the catalyst be alkali metal or alkali metal-containing compounds it is necessary that the catalyst be prepared in closed containers provided with means for exclusion of air. Preferably, the catalyst will be employed shortly after preparation, although the catalyst may be stored for reasonable periods of time if substantial contact with the atmosphere is prevented during removal from the vessel in which the catalyst is prepared, during storage and during subsequent introduction into the reaction chamber. As will be illustrated, the catalyst often may be produced in situ in the reaction vessel.

In general, the larger the amount of catalyst used, the more rapidly the polymerization will proceed at a given temperature and the lower the molecular weight of the resulting product. Desirably, sufficient catalyst should be employed to provide from 0.001 to about 0.5 gram of active metal for each 100 grams of monomer in the polymerization mixture.

Since moisture tends to use up catalyst, it should be excluded from the reaction zone insofar as is possible. Oxygen, nitrogen and other components of the air seriously inhibit the desired polymerization reaction and consequently should be excluded from the reaction zone. In laboratory or small scale equipment, all of these substances conveniently may be removed by bringing the polymerization charge to a boil and venting a small proportion of the charge (e.g., about 10%) prior to sealing the reactor and effecting polymerization. In large scale production, however, charging of the reactor is preferably conducted under an inert atmosphere.

It has been found that the molecular weight and proportion of cis-1,4 structure of the copolymers generally increase as the temperature of polymerization is decreased. Additionally, the reaction is quite difficult to control at elevated temperatures, particularly where monomer of the preferred highest purity is employed. It has also been found that gel content increases as higher polymerization temperatures are employed, especially with lithium containing catalysts. Consequently, it is desirable to operate at the lowest temperature at which a practical yield of the desired product may be obtained. Since polymerization reactions of the type contemplated ordinarily require a considerable induction period, it is often desirable to initiate the polymerization reaction at a higher temperature and then lower the temperature to the desired level by suitable cooling means once the polymerization reaction has been initiated. In this manner, the induction period will be lessened and the benefits of low temperature polymerization, as above indicated, may be obtained. In general, lithium-active and other alkali metal-active copolymers suitable for use in this invention are advantageously produced at temperatures between 0° C. and 150° C. A polymerization temperature of from 40° to 70° C. is preferred.

Particularly desirable for use as starting elastomers in the practice of this invention are those having the linear microstructures described in U.S. Pat. No. 3,317,918. Those derived from butadiene have at least 85% 1,4-structure and no more than 15% vinyl or 1,2-structures. Those derived from isoprene have at least 80% cis-1,4-structure, no more than 10/ trans-1,4-structure, no more than 10% 3,4-structure and substantially no 1,2-structure.

The polymerization is advantageously performed in a non-polar, non-acidic solvent, preferably a hydrocarbon such as those illustrated below. While the polymerization can be performed without solvent, in which case the polymerization product is deposited as a rubbery mass or the polymerization can be terminated well before completion in order to have unreacted monomer serve as suspension medium, generally about 25–50% by volume of solvent is used, based on the total volume.

Solvents operable in the preparation of the lithium-active or other alkali metal-active polymers must be non-polar, non-acidic, organic substances. Suitable solvents include the saturated aliphatic hydrocarbon solvents, such as the straight and branched chain paraffins and cycloparaffins containing from 3 to 16 carbon atoms which include, without limitation, propane, pentane, hexane, petroleum ether, heptane, dodecane, cyclopentane, cyclohexane, methyl cyclohexane, and the like. Aromatic solvents such as benzene, toluene, xylene, and the like are also operable. Mono-olefins can also be used as solvents when a catalyst system is used for which the olefin is immune to polymerization. For example, as pointed out above, the alpha olefins are immune to polymerization with n-Bu lithium unless combined with a chelating compound such as symmetrical-dimethyl ethylene-diamine. Therefore, in the absence of such an effective catalyst system, olefins can be used as solvents, including butylenes, amylenes, hexenes, cyclohexene and the like.

The same considerations as to purity and absence of interfering compounds applying to the monomers also apply to the solvent. A treatment which has been found particularly advantageous for the purification of paraffin solvents, such as petroleum ether, consists of agitating the solvent with concentrated sulfuric acid and thereafter repeatedly washing with water. The solvent may then be suitable dehydrated by passage through silica gel, alumina, calcium chloride or other dehydrating or absorbing media, and thereafter distilled. As in the case of the monomer, the solvent, after being purified, desirably should be handled in contact only with its own vapor or with atmospheres containing only its vapor and inert gases such as helium and argon.

Laboratory scale polymerization reactions producing lithium-active or other alkali metal-active polymers may conveniently be conducted in glass beverage bottles sealed with aluminum lined crown caps. The polymerization bottles should be carefully cleaned and dried before use. The catalyst employed may be added to the bottle by weight, or, where possible, the catalyst can be melted and added by volume. In some instances, it is desirable to add the catalyst as a suspension in the monomer. The monomer is added by volume, desirably employing sufficient excess so that about 10% of the charge can be vented to remove moisture, oxygen and air from the bottle. The removal of oxygen from the free air space above the monomer in the polymerization bottle as well as dissolved oxygen in the monomer is an important step in the bottle loading procedure. The cap is placed loosely on the bottle and the monomer is brought to a vigorous boil as by placing the bottle on a heated sand bath. When approximately 10% of the charge has been vented, the bottle is rapidly sealed with a metal cap having two or three openings and a rubber liner. Such procedure substantially excludes the air and oxygen which drastically inhibit polymerization.

The sealed bottles may be placed on a polymerization wheel immersed in a liquid maintained at a constant temperature, and rotated. Alternatively, the charge bottle may be allowed to stand stationary in a constant temperature bath or otherwise heated or cooled until the polymerization reaction is complete. Ordinarily, the static system which requires a considerably longer reaction, may in some instances be attractive where higher molecular weights are desired. At the end of the polymerization reaction, when properly conducted, all of the monomer has been consumed and there is a partial vacuum in the free space of the reaction vessel.

The time for completion of polymerization varies with the temperature, the time required decreasing with increase in temperature, in any case being completed within 3–4 hours and at the higher temperatures in the cited range, substantial polymerization is effected within one-half hour.

After polymerization has been completed, and the bottle cooled to handling temperature, the phosphazene is injected through the rubber liner by means of a hypodermic syringe. The bottle is then shaken and heating renewed at 0–150° C., preferably 50–70° C. for from five minutes to three hours. The postreacted polymer may be removed by cutting the bottle open.

Small and large scale polymerizations can also be run in stainless steel stirred reactors. Corresponding techniques are employed in large scale polymerization processes. Usually the reaction will be carried out in a closed autoclave provided with a heat transfer jacket and a rotary agitator. Avoidance of oxygen contamination is most easily secured by evacuating the vessel prior to charging the monomer (and solvent, if used) and employing an inert atmosphere. To insure the purity of the monomer and solvent, a silica gel or other suitable adsorption column is preferably inserted in the charging line employed for introduction of these materials to the reactor. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature.

The invention is being illustrated by the following examples. These examples are given for purposes of illustration and are not intended in any way to restrict the scope of the invention nor the manner in which it can be practiced. Unless specified otherwise, parts and percentages are given by weight.

Example I.—In batch preparation "live" butadiene polymer is prepared in a two-quart stainless steel reactor equipped with stirrer and adapted for removal of samples. A mixture of 250 grams of butadiene and 1220 grams of hexane (calculated to give a polymerization product containing 17% solids) is introduced into the reactor. The temperature is raised to 120° F. after which 0.555 gram millimole of n-butyl lithium per 100 grams of monomer is introduced. After three hours at this temperature, a sample is removed and the percent solids determined by evaporation of the solvent. When such sample testing shows a conversion of 98–100%, the "live" polymer is ready for postreaction. The amount of polymer remaining in the reactor is calculated by subtracting from the original amount of monomer, the amount removed as polymer in the sample testing. From this, the proportionate amount of polymeric lithium remaining in the reactor is also calculated. The reactor temperature is then raised to 175° F. and the phosphazene is added, preferably in a proportion of one millimole of phosphazene per millimole of active lithium in the polymer.

A series of experiments are performed in which various phosphazenes are used. The postreactant is added and allowed to react with the live or lithium-active polymer and samples are removed for a determination of molecular weight at one, two and three hour intervals to determine the progress of the postreaction. The phosphazenes, proportions and results are given in the various subsequent examples. In the tablets, the Williams' Plasticity figures represent the measured height of the polymer sample, in millimeters, after 0.5 minute under a standard load and again after 3.0 minutes under the load. The recovery values indicate the resistance of the polymer to flow or deformation by showing the increase in height of the sample after a rest period of 1.0 minute following the determination of the 3.0 minute plasticity figure. The plasticity figure is obviously inversely proportional to the plasticity of the polymer.

Example II.—The procedure of Example I is repeated a number of times using an active polybutadiene prepared by using 0.75 gram millimole of butyl lithium per 100 grams of monomer. The polymerization is effected at 50° C. for three hours and then various amounts of phosphonitrile dichloride trimer are added respectively as indicated below in Table I, and the postreaction conducted at room temperature for 16 hours. The table also gives the ratio of chlorine to lithium in the reaction mass and tabulates the Williams' Plasticity as determined on the product.

TABLE I

| mM. $(PNCl_2)_3$ | Ratio Cl/Li | Williams' Plasticity | | |
|---|---|---|---|---|
| | | 0.5 min., mm. | 3.0 min., mm. | 1.0 min. recovery after 3.0 min. load, mm. |
| 0 | 0 | 3.16 | 2.05 | 0.08 |
| 0.075 | 0.50 | 5.50 | 4.11 | 1.17 |
| 0.100 | 0.67 | 6.80 | 5.21 | 2.64 |
| 0.125 | 0.83 | 7.05 | 5.23 | 2.85 |
| 0.150 | 1.00 | 7.64 | 5.72 | 3.40 |

Example III.—The procedure of Example II is repeated a number of times using 0.91 millimole of butyl lithium in place of the 0.75 of Example II. The postreaction is conducted at 50° C. for 16 hours using the amount of phosphonitrile dichloride tetramer indicated in the table. As indicated in Table II, the Williams' Plasticity is vastly improved in comparison with the control which uses none of the postreactants.

TABLE II

| mM. $(PNCl_2)_4$ | Ratio Cl/Li | Williams' Plasticity | | |
|---|---|---|---|---|
| | | 0.5 min., mm. | 3.0 min., mm. | 1.0 min. recovery after 3.0 min. load, mm. |
| 0 | 0 | 4.09 | 2.60 | 0.27 |
| 0.0854 | 0.750 | 8.13 | 6.17 | 2.93 |
| 0.0996 | 0.875 | 7.39 | 5.46 | 3.14 |
| 0.1138 | 1.000 | 7.43 | 5.50 | 2.37 |
| 0.1280 | 1.125 | 8.87 | 7.26 | 2.31 |

Example IV.—The procedure of Example II is repeated three times using 1.017 gram millimoles of butyl lithium in preparing the lithium-active polybutadiene. In this case, however, the phosphonitrile dichloride trimer was used instead of the tetramer used in Example III. The amounts of trimer used and the improvements in Williams' Plasticity are indicated by the corresponding values given in Table III.

TABLE III

| mM. (PNCl₂)₃ | Ratio Cl/Li | Williams' Plasticity | | |
|---|---|---|---|---|
| | | 0.5 min., mm. | 3.0 min., mm. | 1.0 min. recovery after 3.0 min. load, mm. |
| 0.1625 | 0.83 | 8.84 | 6.54 | 2.22 |
| 0.1950 | 1.00 | 9.44 | 8.40 | 1.76 |
| 0.2275 | 1.17 | 7.88 | 6.24 | 2.58 |

Example V.—The procedure of Example IV is repeated a number of times in which the amount of butyl lithium used in preparing the lithium-active polymer is varied, and in each case the corresponding lithium-active polymer is run with a control in which no phosphazene is used, and with corresponding samples various amounts of phosphonitrile dichloride trimer are used as indicated below in Table IV. As indicated in Table IV, the Williams' Plasticity values are improved, and the Mooney viscosity (ML4–100° C.) values are substantially increased.

TABLE IV

| Active, mM. BuLi | nM. (PNCl₂)₃ | Mooney viscosity | Williams' Plasticity | | |
|---|---|---|---|---|---|
| | | | 0.5 min., mm. | 3.0 min., mm. | 1.0 min. recovery after 3.0 min. load, mm. |
| 1.00 | 0 | 18.0 | | | |
| 1.00 | 0.1167 | 93.5 | 7.75 | 6.03 | 3.24 |
| 1.14 | 0 | 9.5 | | | |
| 1.14 | 0.1900 | 72.0 | 7.52 | 5.60 | 3.60 |
| 1.28 | 0 | 9.0 | | | |
| 1.28 | 0.2152 | 59.2 | 7.26 | 5.42 | 3.09 |
| 1.42 | 0 | 11.5 | | | |
| 1.42 | 0.2368 | 57.5 | 7.25 | 5.05 | 2.01 |

Example VI.—The procedure of Example II is repeated a number of times using in place of the lithium-active butadiene elastomer of that example an equivalent weight respectively of each of the following lithium-active elastomers containing an equivalent amount of lithium as in Example II:

Polyisoprene
Butadiene-styrene 75–25 copolymer
Isoprene-styrene 85–15 copolymer
Butadiene-isoprene-styrene 50–25–25 terpolymer In each case the postreaction product is notably improved in molecular weight and processability as noted above without any sacrifice of elastomeric properties.

Example VII.—The procedure of Example II is repeated a number of times using in place of the lithium-active elastomer of that example a corresponding elastomer which has been formed so as to give the corresponding sodium-active polybutadiene, potassium-active polybutadiene, cesium-active polybutadiene, rubidium-active polybutadiene by using the corresponding alkali metal n-butyl compound to catalyze the polymerization. In each case upon postreaction as in Example II, the product is notably improved in molecular weight and processability as noted above without any sacrifice of elastomeric properties.

Example VIII.—In a continuous process a lithium-active polybutadiene prepared as in Example I is fed to a centrifugal pump, which serves as a mixer, and phosphonitrile dichloride trimer is added to the polymer solution in the pump as a solution in an inert solvent such as hexane. The solution of the postreactant is prepared by first drying the solvent with a dessicant to prevent undesirable side reactions with the alkali metal. The rate of addition of the postreactant solution is controlled to give the same ratio of the reactant to the amount of lithium contained in the polymer as used in Example II. The resultant solution is fed from the centrifugal pump to a reactor provided with agitation and means for maintaining a temperature of 180–200° F. for a sufficient residence time to complete the postreaction. The results obtained are similar to those in the batch process of Example II.

The postreactions of this invention are advantageously conducted until there is an increase in the average molecular weight of at least 15%. In some cases, particularly where very low molecular weight elastomers are used as starting materials, the percent increase is even much higher. Depending on the temperature used, the postreaction period is at least one minute, preferably at least one hour.

A number of improvements have been noted in the products of this invention due to the presence of phosphorus in the polymeric molecules, such as, for example, improvements in processability in fabrication, improved vulcanization rate, higher tensile strength and higher modulus. Generally such improvements are noted when at least 0.3 percent, preferably 0.6 percent by weight of phosphorus is present.

The novel polymers can be blended with other known polymers to provide useful commercial compositions for fabrication into useful shapes and articles. The novel rubbery polymers are advantageously blended with known rubbers (e.g., natural rubber, SBR, BR, IR, IIR, CR, ISR), with or without extending oils, for forming vulcanizates of great technical importance. The novel rubbery polymers are advantageously compounded with the known reinforcing carbon blacks to produce useful commercial stocks which may also contain one or more additional rubbery polymers, and may also contain 5 to 100 phr. (parts per 100 parts of the rubber) of extending oil or plasticizer. Sulfur and other known vulcanizing agents for natural rubber and the commercial synthetic rubbers are useful for forming vulcanizable stocks containing a novel polymer of the invention. Known antioxidants, stabilizers and antiozonants for natural and commercial synthetic rubbers find similar utility in compositions containing the novel polymers of the invention. Known methods of mixing, forming, fabricating and curing compositions of natural and commercial synthetic rubbers are applicable to and useful with compositions containing the novel polymers of the invention. The novel polymers of the invention are especially useful in pneumatic tire tread, sidewall and carcass compositions, and the considerations of this paragraph are especially relevant to the use of the novel polymers in tires.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:
1. A process for increasing the molecular weight of an elastomer but retaining processability and elastomeric properties in the resultant product comprising the steps of reacting an alkali metal-active elastomer, prepared in the presence of an alkali metal hydrocarbon catalyst from a conjugated diene of the formula

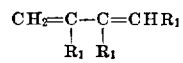

wherein $R_1$ is hydrogen, alkyl or aryl having no more than 7 carbon atoms, said elastomer containing 0.1–10 gram millimoles of attached alkali metal per 100 grams of elastomer, at a temperature of −50 to 150° C. with a phosphazene having the formula $(PNCl_2)_x$ wherein $x$ has a value of 3 or 4, said phosphazene being used in a proportion of 0.01–100 gram millimoles per 100 grams of polymer and said reaction being conducted until there has been at least 15 percent increase in molecular weight of said elastomer.

2. The process of claim 1 in which said temperature is 20–120° C.

3. The process of claim 1 in which said alkali metal is lithium.

4. The process of claim 1 in which said alkali metal is present in said elastomer in a proportion of 0.4–0.8 gram millimole per 100 grams by weight of said elastomer.

5. The process of claim 1 in which said phosphazene is used in a proportion of 0.02–0.25 gram millimole per 100 grams by weight of elastomer.

6. The process of claim 1 in which said elastomer is polybutadiene.

7. The process of claim 1 in which said elastomer is a copolymer of butadiene and styrene containing 5–50 percent by weight of styrene copolymerized therein.

8. The process of claim 1 in which said alkali metal is lithium and said elastomer is a polymeric butadiene.

9. The process of claim 8 in which said polymeric butadiene is a butadiene-styrene copolymer having 5–50 percent by weight of styrene copolymerized therein.

10. The process of claim 8 in which said polymeric butadiene is polybutadiene.

11. The process of claim 1 in which said elastomer is polymeric isoprene.

12. The process of claim 11 in which said elastomer is polyisoprene.

13. The process of claim 11 in which said elastomer is a copolymer of isoprene having 5–50 percent by weight of styrene copolymerized therein.

References Cited

UNITED STATES PATENTS

| | | | |
|---|---|---|---|
| 3,078,254 | 2/1963 | Zelinski et al. | 260—45.5 |
| 3,097,193 | 7/1963 | Gruver | 260—85.1 |
| 3,135,716 | 6/1964 | Uraneck et al. | 260—45.5 |
| 3,150,209 | 9/1964 | Short et al. | 260—894 |
| 3,274,147 | 9/1966 | Zelinski et al. | 260—41.5 |

JAMES A. SEIDLECK, Primary Examiner

W. F. HAMROCK, Assistant Examiner

U.S. Cl. X.R.

260—82.1, 83.3, 83.5, 85.3, 94.7